United States Patent [19]
Ohara et al.

[11] Patent Number: 5,461,489
[45] Date of Patent: Oct. 24, 1995

[54] IMAGE SIGNAL PROCESSING DEVICE

[75] Inventors: Eiji Ohara; Makoto Kondo; Takefumi Takubo, all of Kanagawa, Japan

[73] Assignee: Canon Kabushiki Kaisha, Tokyo, Japan

[21] Appl. No.: 215,162

[22] Filed: Mar. 18, 1994

Related U.S. Application Data

[63] Continuation of Ser. No. 740,497, Aug. 5, 1991, abandoned.

[30]     Foreign Application Priority Data

Aug. 31, 1990 [JP] Japan .................................. 2-230261
Sep. 4, 1990 [JP] Japan .................................. 2-234983

[51] Int. Cl.⁶ .................................................... H04N 1/36
[52] U.S. Cl. ...................... 358/409; 348/689; 348/616; 348/607; 358/443; 358/446; 358/445
[58] Field of Search ................................... 358/336, 166, 358/409, 410, 412, 401, 443, 446, 171; 348/689, 616, 607

[56]            References Cited

U.S. PATENT DOCUMENTS

| | | | |
|---|---|---|---|
| 4,631,598 | 12/1986 | Burkhardt et al. | 358/455 |
| 4,748,677 | 5/1988 | Yokomizo | 358/446 |
| 4,853,782 | 8/1989 | Asano et al. | 358/172 |
| 5,010,395 | 4/1991 | Tsuji et al. | 358/172 |
| 5,019,905 | 5/1991 | Pshtissky et al. | 358/172 |

*Primary Examiner*—Edward L. Coles, Sr.
*Assistant Examiner*—Fan Lee
*Attorney, Agent, or Firm*—Robin, Blecker, Daley & Driscoll

[57]            ABSTRACT

An image signal processing device is arranged to convert an analog image signal into a digital image signal after the analog image signal is clamped, to separate, in the form of a digital signal, a synchronizing signal from the digital image signal and to control a clamping action on the analog image signal according to a state of the separated digital synchronizing signal. The arrangement enables the device to always stably perform the clamping action.

6 Claims, 13 Drawing Sheets

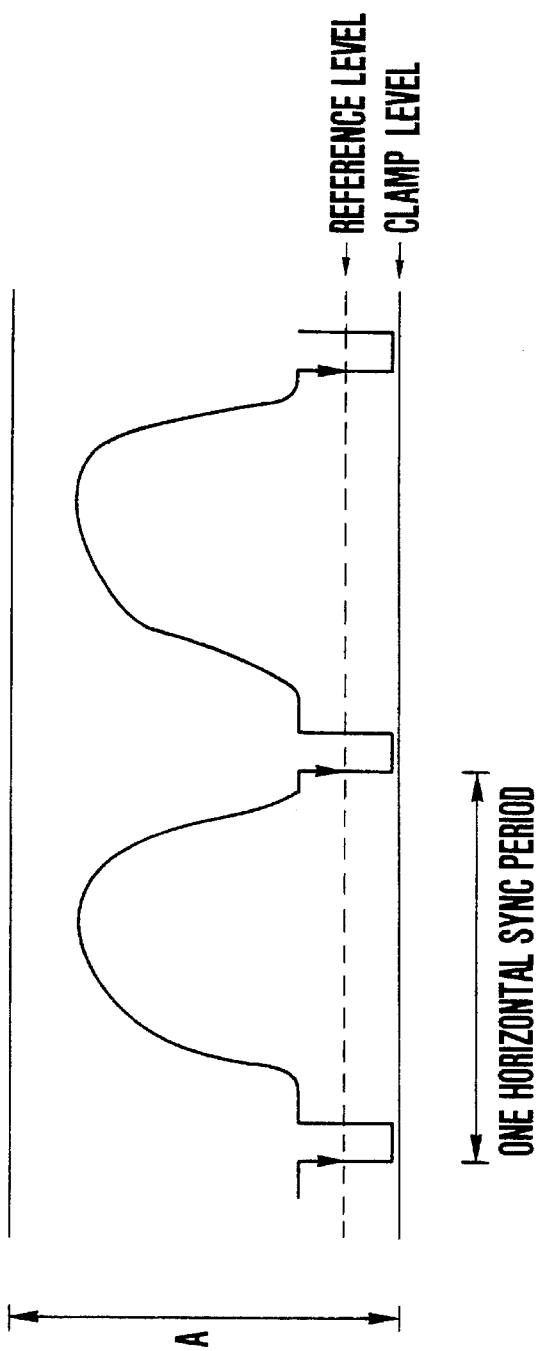
F I G. 7(a)
F I G. 7(b) CLAMP PULSE

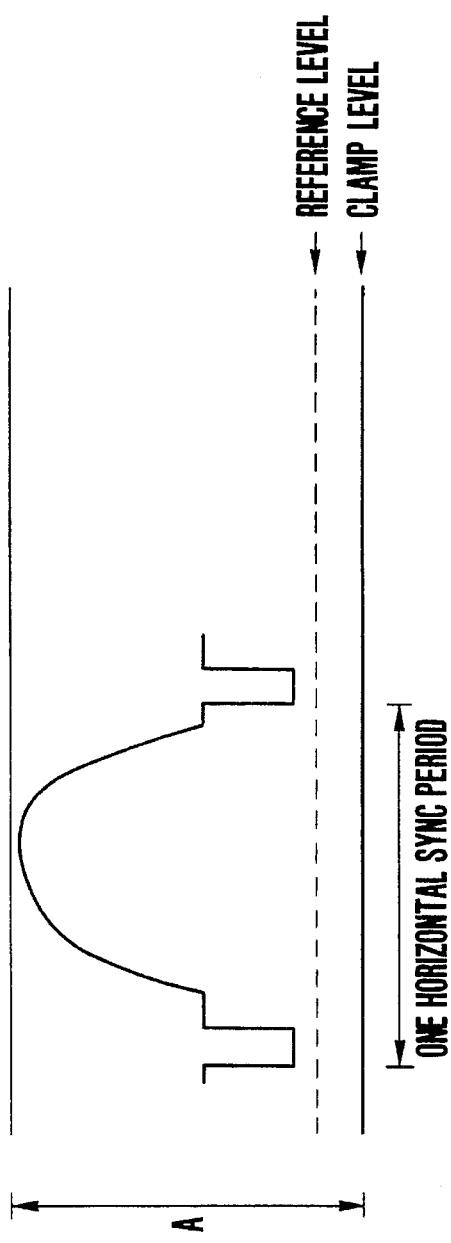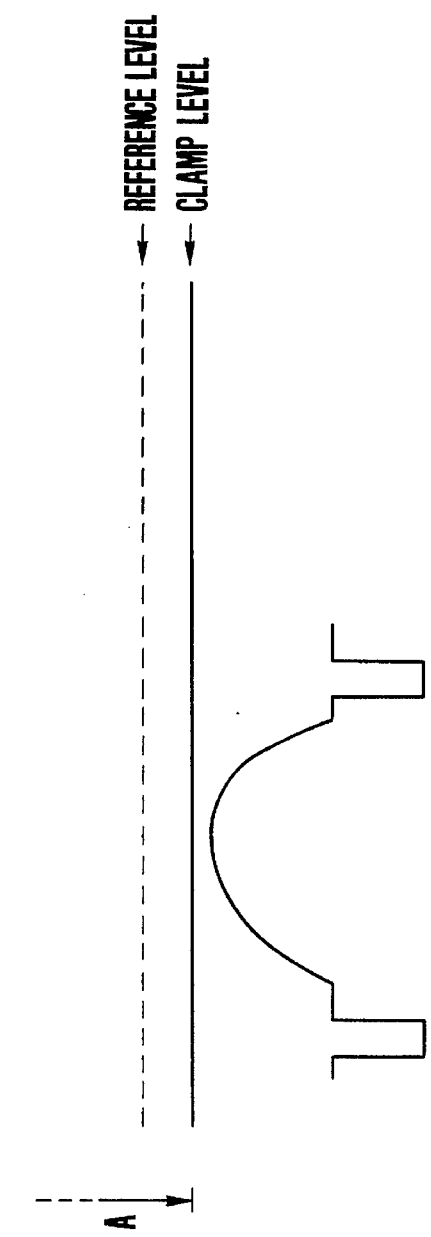

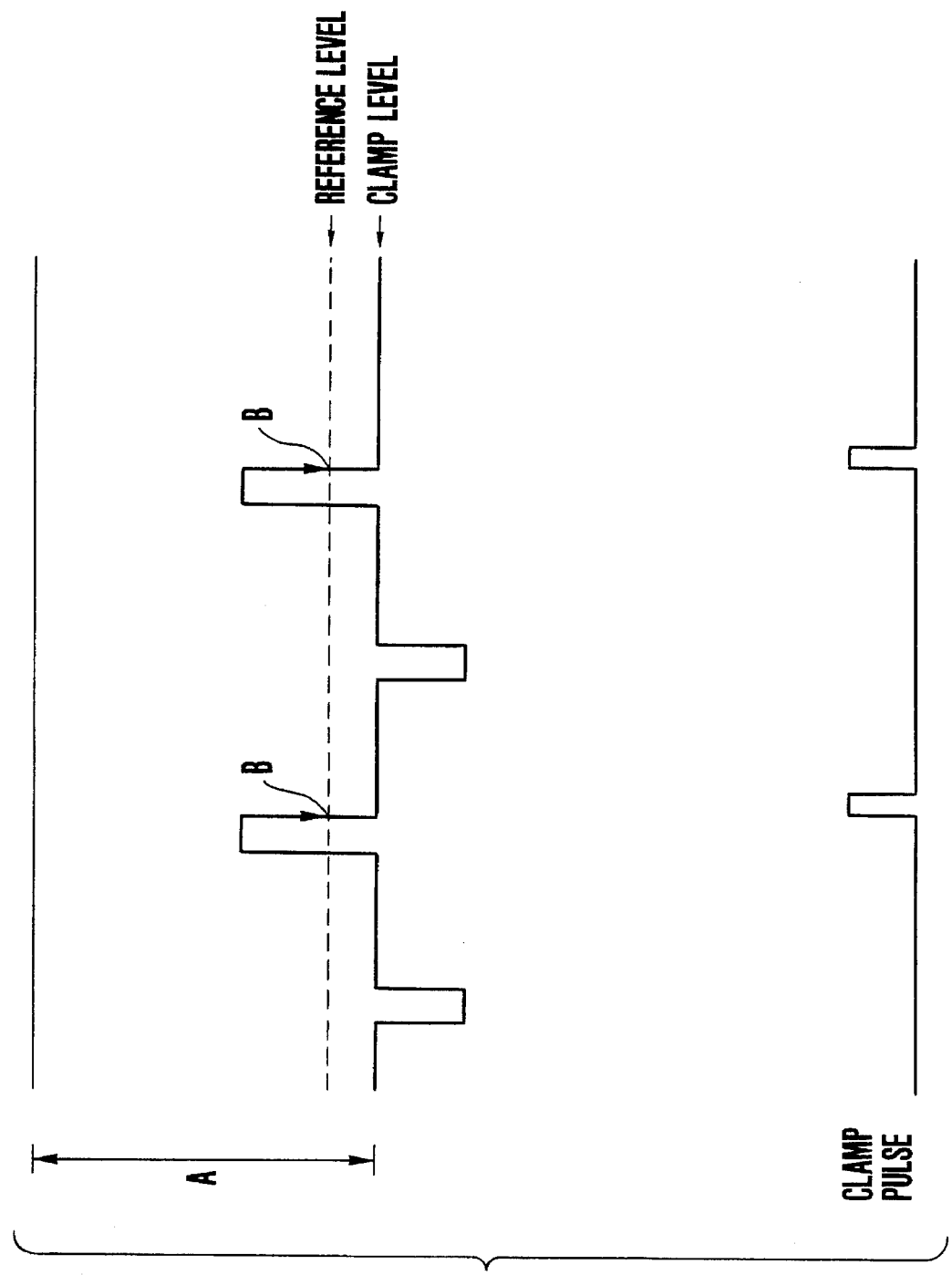

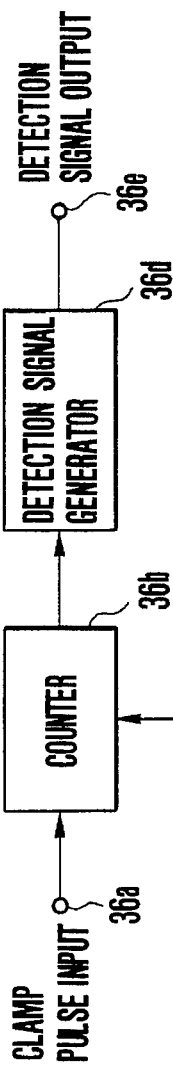
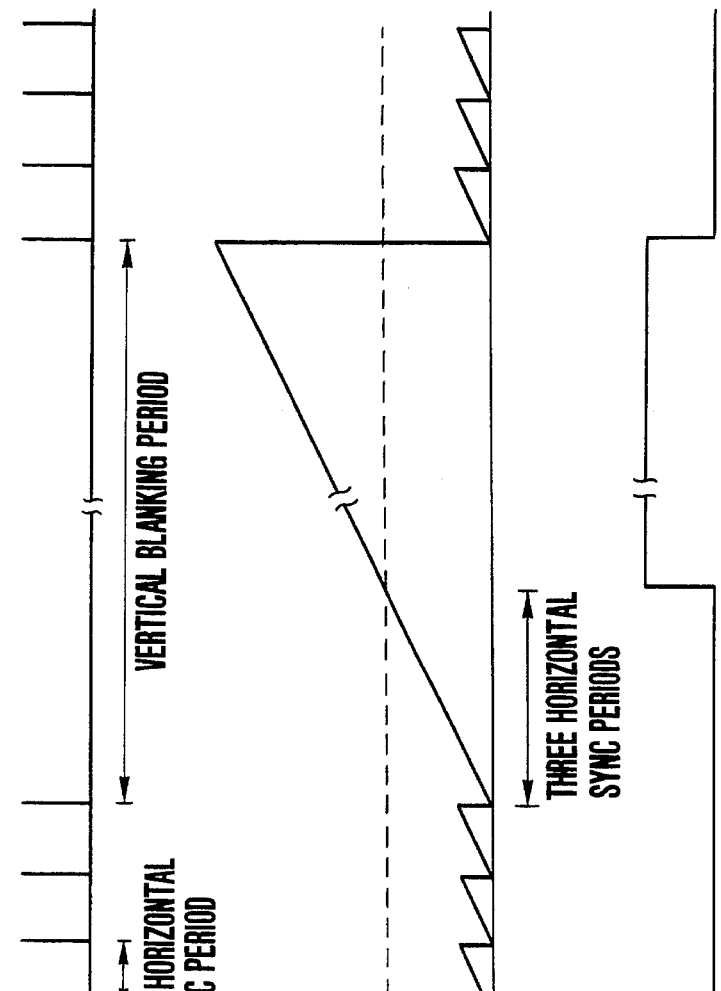

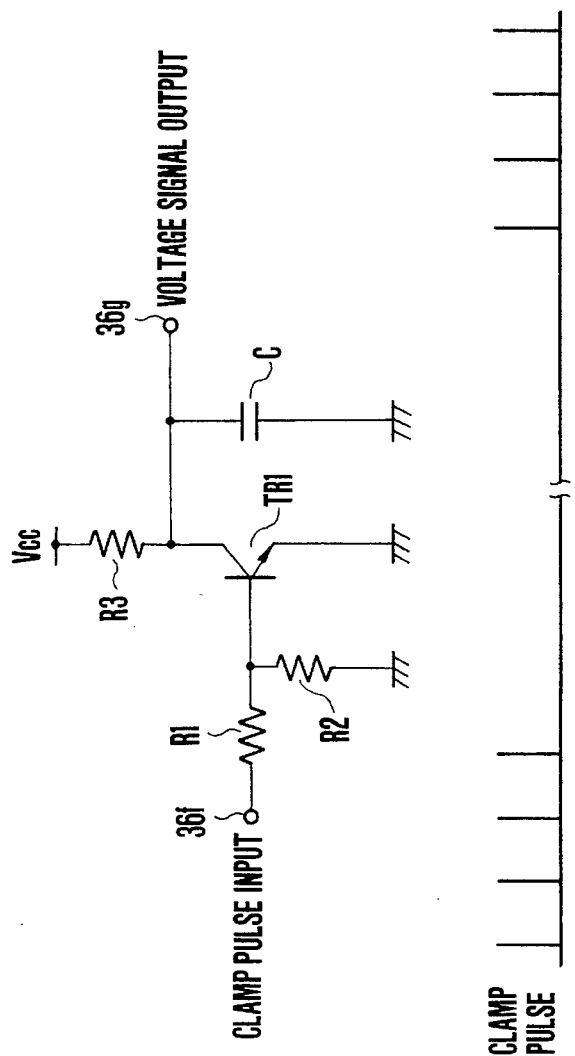
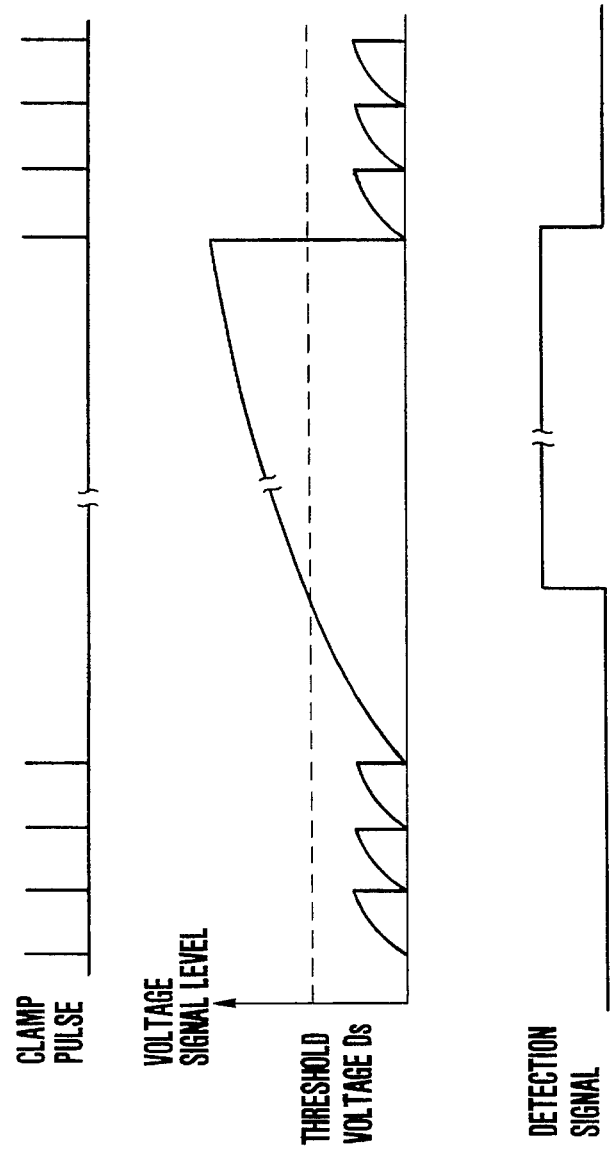
FIG.10(a)
FIG.10(b)
FIG.10(c)
FIG.10(d)

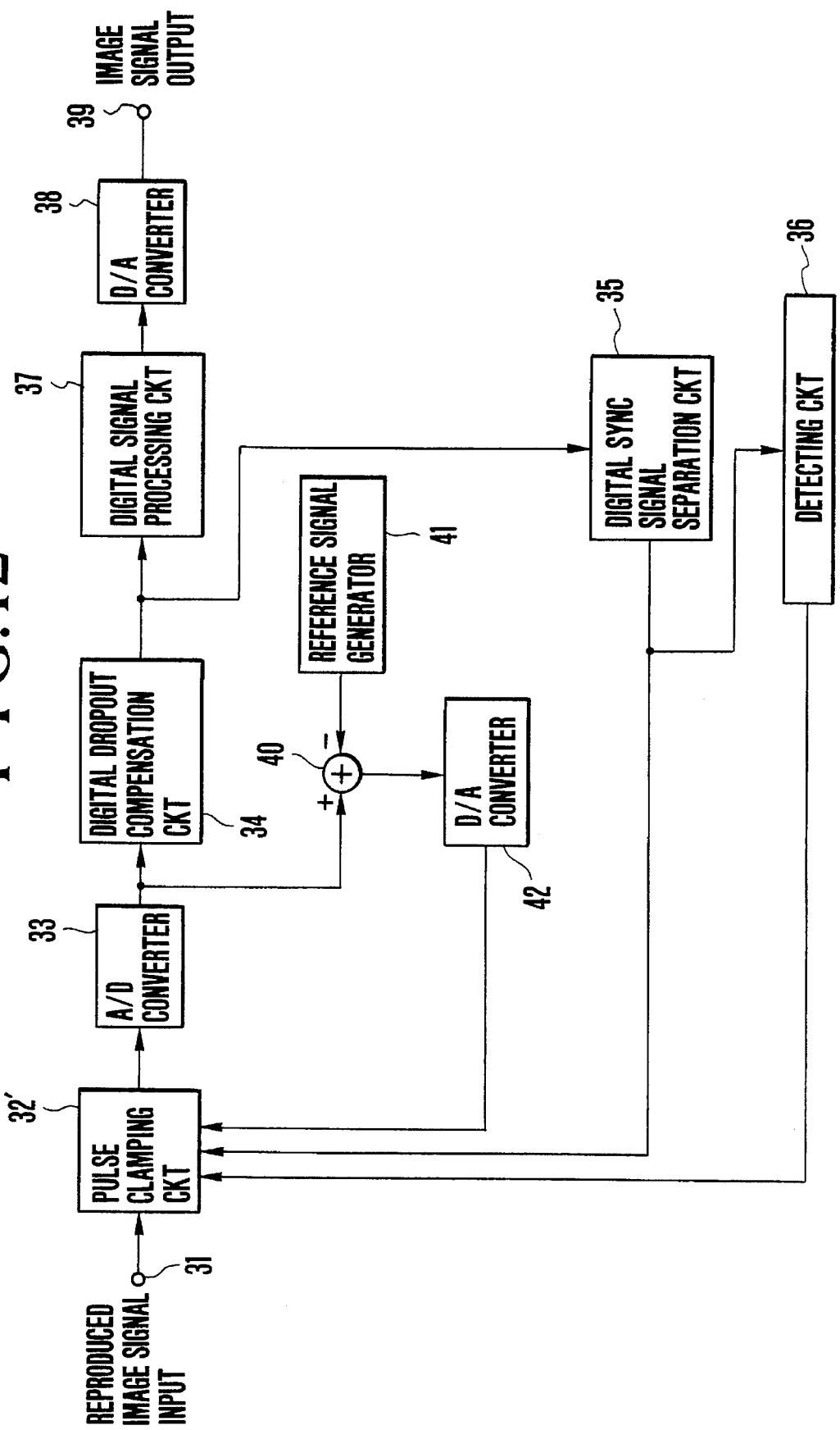

IMAGE SIGNAL PROCESSING DEVICE

This is a continuation application under 37 CFR 1.62 of prior application Ser. No. 07/740,497, filed Aug. 5, 1991, now abandoned.

BACKGROUND OF THE INVENTION

1. Field of the Invention

This invention relates to an image signal processing device for processing an image signal.

2. Description of the Related Art

A clamping circuit has heretofore been used for an image signal processing device. The clamping circuit is arranged to form clamp pulses in synchronism with a composite synchronizing signal which is separated from an image signal and to clamp the image signal in accordance with the clamp pulses.

The composite synchronizing (hereinafter referred to as sync) signal can be accurately separated if the clamping process on the image signal is accurately and instantly carried out upon completion of build-up of the device. Then, the clamp pulses which are formed by using the accurate composite sync signal enable the clamping circuit to normally operate.

If the image signal is not accurately clamped, the clamp pulses cannot be accurately formed, because the composite sync signal cannot be separated from the image signal. Under such a condition, the clamping circuit fails to normally carry out a pulse clamping process.

Further, some of the conventional devices for processing image signals have been arranged to reproduce an image signal recorded on a recording medium and to digitize the reproduced image signal before processing.

FIG. 1 of the accompanying drawings shows in outline the arrangement of the conventional image signal processing device. The device includes an input terminal 50 which is arranged to receive a reproduced image signal; a dropout compensation circuit 51; a sync signal separation circuit 52; a pulse clamping circuit 53; an A/D converter 54; a digital signal processing circuit 55; a D/A converter 56; and an image signal output terminal 57.

Referring to FIG. 1, an image signal reproduced from a recording medium which is not shown is supplied to the dropout compensation circuit 51 through the input terminal 50. The dropout compensation circuit 51 is arranged to detect any dropout occurring in the image signal supplied and to compensate the image signal for a dropout generating period by interpolating it with a signal which is obtained by delaying the image signal by means of a delay element or the like. The image signal which is thus dropout-compensated by the dropout compensation circuit 51 is pulse-clamped by the pulse clamping circuit 53.

To prevent a faulty clamping action due to a dropout, the pulse clamping circuit 53 is arranged to perform a clamping action by using as clamp pulses the composite sync signal separated by the sync signal separation circuit 52 from the image signal which has been dropout-compensated by the dropout compensation circuit 51.

After undergoing the clamping process performed by the pulse clamping circuit 53, the image signal is digitized by the A/D converter 54. The digital image signal thus obtained is supplied to the digital signal processing circuit 55 to be subjected to digital signal processing actions such as a noise reducing process using a line memory, etc. After the digital signal processing circuit 55, the image signal is supplied to the D/A converter 56 to be converted back into an analog signal. The analog image signal is output from the output terminal 57.

However, in the conventional image signal processing device which is arranged as described above, an analog signal processing part coexists with a digital signal processing part, so that a circuit scale becomes large and the use of an IC for the circuit arrangement is made difficult. Further, the inclusion of the analog signal processing circuit not only deteriorates the stability of the circuit operation of the device in relation to temperature variations but also makes circuit adjustment, etc., difficult.

SUMMARY OF THE INVENTION

It is an object of this invention to provide an image signal processing device which is arranged to solve the problems mentioned in the foregoing.

It is another object of the invention to provide an image signal processing device which is arranged to be capable of always stably performing a clamping process on an image signal.

Under this object, an image signal processing device arranged according to this invention as an embodiment thereof comprises clamping means arranged to receive an image signal and to clamp the image signal; sync signal separation means for separating a sync signal from the image signal clamped by the clamping means; equalizing pulse period detection signal forming means for forming an equalizing pulse period detection signal which corresponds to an equalizing pulse period, in synchronism with the sync signal separated by the sync signal separation means; and control means for controlling a clamping action of the clamping means according to a state of the equalizing pulse period detection signal formed by the equalizing pulse period detection signal forming means.

It is a further object of the invention to provide an image signal processing device which is arranged to permit use of an IC without difficulty, to excel in operation stability in relation to temperature variations and to facilitate adjustment, etc.

Under that object, an image signal processing device which is arranged according to this invention as another embodiment thereof comprises clamping means arranged to receive an analog image signal, to clamp the analog image signal and to output a clamped analog image signal; analog-to-digital converting means for converting the clamped analog image signal output from the clamping means into a digital image signal; and control means for controlling a clamping action of the clamping means according to a state of a composite sync signal included in the digital image signal output from the analog-to-digital converting means.

These and further objects and features of this invention will become apparent from the following detailed description of embodiments thereof taken in conjunction with the accompanying drawings.

BRIEF DESCRIPTION OF THE DRAWINGS

FIGS. 7(*a*) and 7(*b*) show in a timing chart the normal operation timing of a pulse clamping circuit 32 shown in FIG. 6.

FIGS. 8(*a*), 8(*b*) and 8(*c*) show in a timing chart the abnormal operation timing of the pulse clamping circuit 32 shown in FIG. 6.

FIGS. 9(*a*), 9(*b*), 9(*c*) and 9(*d*) show by way of example the details of a detecting circuit 36 of FIG. 6 and the operation timing of the same circuit.

FIGS. 10 (*a*), 10 (*b*), 10 (*c*) and 10 (*d*) show another example of the details of the detecting circuit 36 and the operation timing of the same.

FIG. 12 is a block diagram showing in outline the arrangement of an image signal processing circuit which is arranged as a third embodiment of this invention.

DETAILED DESCRIPTION OF THE PREFERRED EMBODIMENTS

Figure 1:
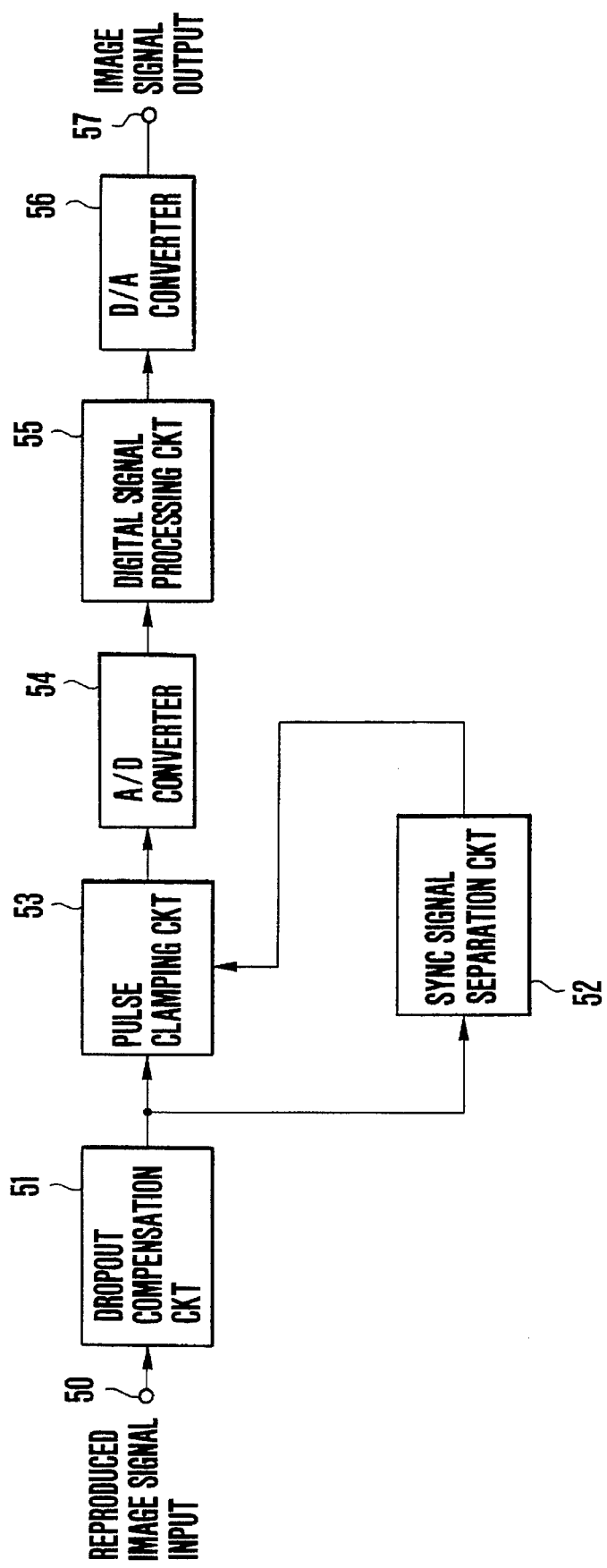
FIG. 1 is a block diagram showing in outline the arrangement of the conventional image signal processing device.
Figure 2:
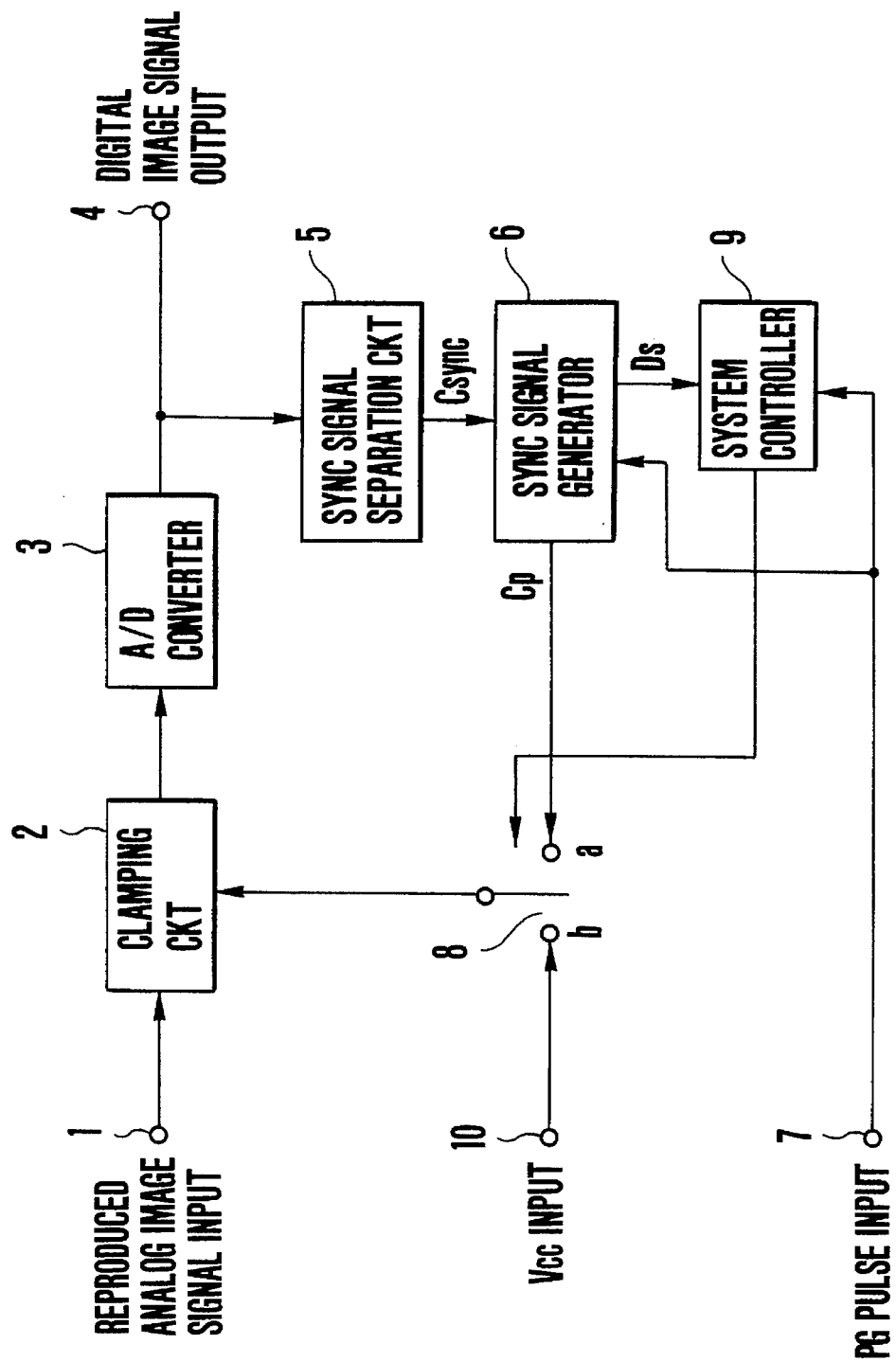
FIG. 2 is a block diagram showing in outline the arrangement of a reproducing apparatus of a still video system to which this invention is applied as a first embodiment thereof.

This invention is described below through some of the embodiments thereof:

FIG. 2 shows in outline the arrangement of a reproducing apparatus of a still video system to which this invention is applied as a first embodiment thereof. Referring to FIG. 2, an analog image signal reproduced from a magnetic disc which is not shown is supplied to a clamping circuit 2 through an input terminal 1. The reproduced image signal is clamped by the clamping circuit 2 and is then supplied to an A/D converter 3 to be digitized there before the image signal is output from an output terminal 4.

The digital image signal output from the A/D converter 3 is supplied also to a sync signal separation circuit 5 as well as the output terminal 4. The sync signal separation circuit 5 then separates a composite sync signal Csync which is included in the image signal. The separated composite sync signal Csync is supplied to a sync signal generator 6.

Meanwhile, a phase signal generating coil ("PG" coil) which is not shown produces PG pulses in synchronism with the rotation of the magnetic disc. The PG pulses are supplied also to the sync signal generator 6 through a PG pulse input terminal 7. Using the composite sync signal and the PG pulses thus received, the sync signal generator 6 forms clamp pulses Cp and an equalizing pulse period detection signal Ds. The clamp pulses Cp are supplied to one terminal "a" of a changeover switch 8 while the equalizing pulse period detection signal is supplied to a system controller 9.

To the other terminal "b" of the change-over switch 8, a voltage signal Vcc of a given voltage is supplied through an input terminal 10. The system controller 9 makes a check by using the PG pulses and the equalizing pulse period detection signal to find if the image signal is being correctly clamped by the clamping circuit 2. The system controller 9 then controls the connecting action of the change-over switch 8 according to the result of the check in such a way as to ensure a correct clamping action of the clamping circuit 2.

Figure 3:
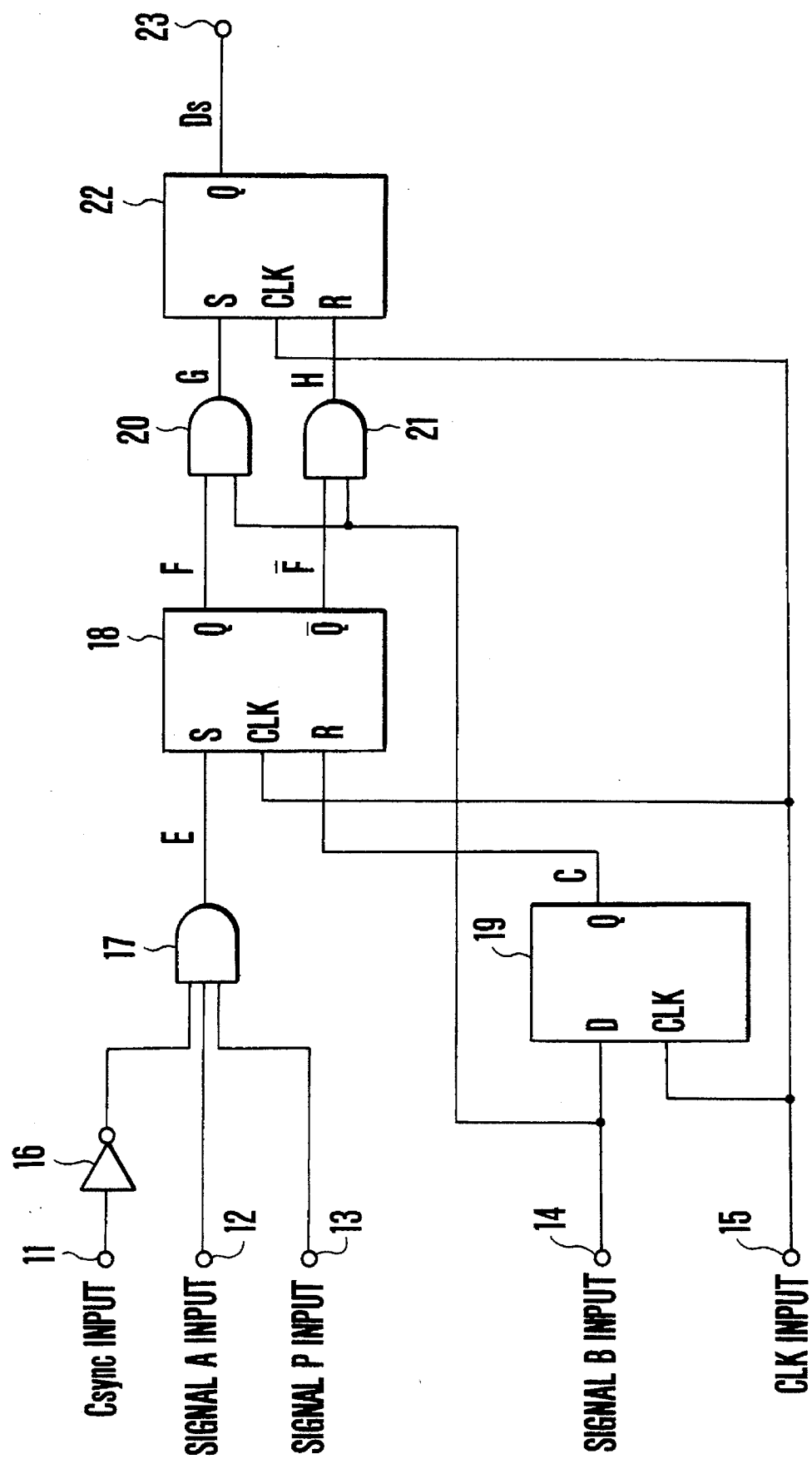
FIG. 3 is a circuit diagram showing by way of example the details of an equalizing pulse period detection circuit disposed within a sync signal generator 6 shown in FIG. 2.

The following describes in detail the operation of the arrangement shown in FIG. 2:

FIG. 3 shows by way of example the arrangement of an equalizing pulse period detection signal generating circuit included in the sync signal generator 6 of FIG. 2.

Figure 4:
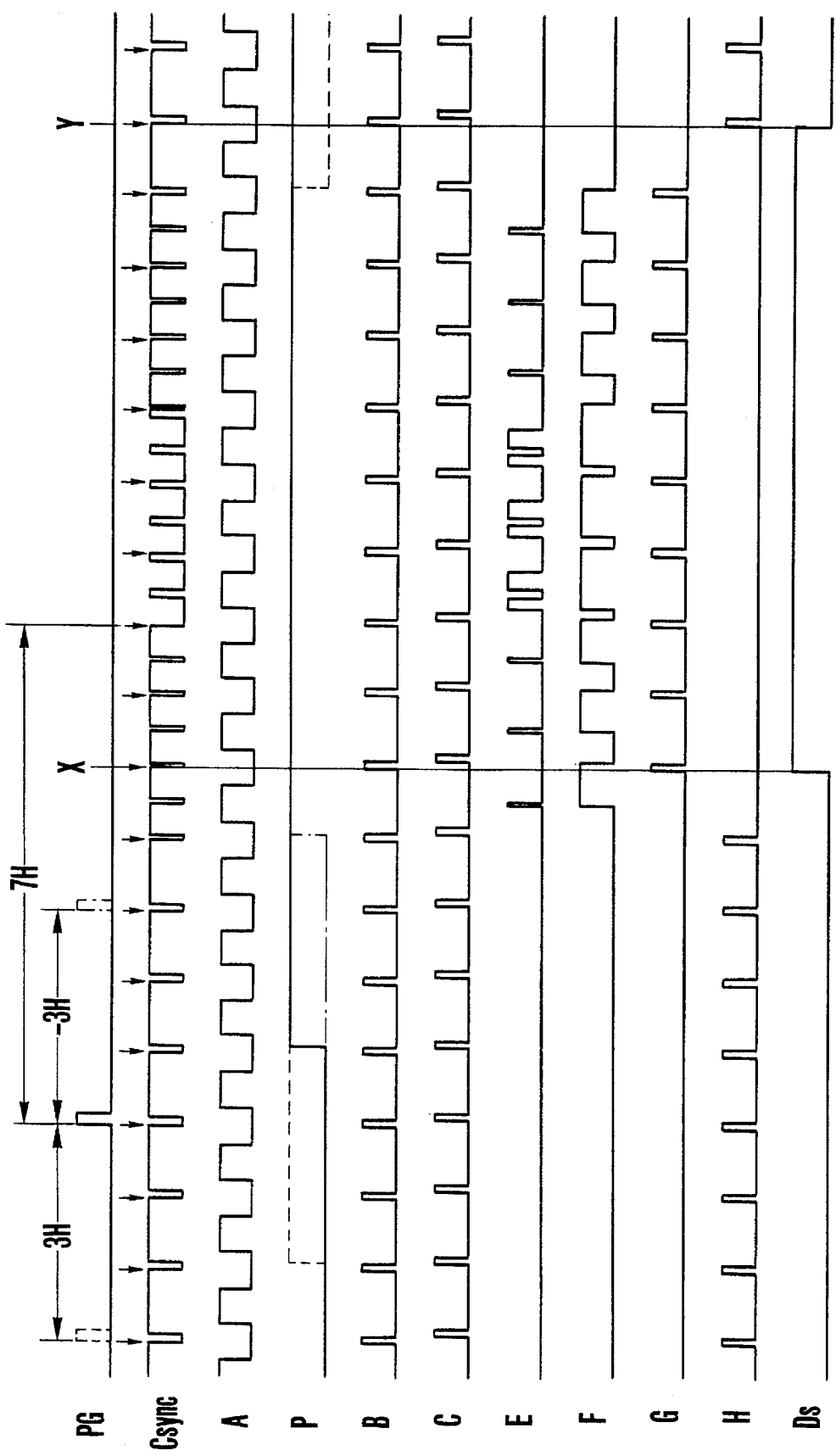
FIG. 4 is a timing chart showing a signal waveform obtained at each part of the arrangement shown in FIG. 3.

FIG. 4 is a timing chart showing the signal waveform which is obtained at each of various parts shown in FIG. 3.

Referring to FIG. 3, an input terminal 11 is arranged to receive the composite sync signal (Csync in FIG. 4) which is separated by the sync signal separation circuit 5. An input terminal 12 is arranged to receive, from another circuit disposed within the sync signal generator 6, a signal A which is formed in synchronism with the fall edges (indicated by arrows in FIG. 4) of a horizontal sync signal Hsync included in the composite sync signal and is arranged to mask equalizing pulses.

Further, in the still video system, the image signal is recorded in each of the recording tracks formed on the magnetic disc in such a manner that the fall edge of a vertical sync signal included in the image signal appears within a range of 7 H±3 H ("H" represents one horizontal scanning period) from a point at which the PG pulse is detected. A signal P is formed by another circuit within the sync signal generator 6 in such a way as to rise at the rise edge of the horizontal sync signal obtained for the first H period after detection of the edge of the PG pulse and to fall at the rise edge of the horizontal sync signal obtained for the 16th H period. The signal P thus formed is supplied to an input terminal 13 of FIG. 3.

A clock signal CLK for actuating the equalizing pulse period detection signal generating circuit of FIG. 3 is supplied to an input terminal 15. To another input terminal 14 of FIG. 3 is supplied a signal B which is formed by some other circuit within the sync signal generator 6 in such a way as to make its level high at the fall edge of the horizontal sync signal included in the composite sync signal and remain high for one clock period of the clock signal.

Referring again to FIG. 3, the composite sync signal Csync which is inverted by an inverter 16, the signal A and the signal P are supplied to an AND gate 17. The AND gate 17 then produces an equalizing pulse signal E which is shown in FIG. 4. The equalizing pulse signal E is supplied to the S terminal of an SR flip-flop 18.

The signal B is supplied to the D terminal of a flip-flop 19. Meanwhile, the clock signal is supplied to the CLK terminal of the flip-flop 19. A signal C which is formed by delaying, as much as one clock period, an edge detection signal indicative of detection of the edges of the horizontal sync signal (i.e., the signal B) is output from the D flip-flop 19. The signal C is supplied to the R terminal of the above-stated flip-flop 18. Further, the clock signal is supplied to the CLK terminal of the SR flip-flop 18. A signal F which is shown in FIG. 4 and a signal F̄ which is obtained by inverting the signal F are supplied from the flip-flop 18 to AND gates 20 and 21 respectively.

The above-stated signal B is supplied also to the AND gates 20 and 21. The AND gate 20 produces a signal G, which is supplied to the S terminal of an SR flip-flop 22. The AND gate 21 produces a signal H, which is supplied to the R terminal of the SR flip-flop 22.

The clock signal is supplied to the CLK terminal of the SR flip-flop 22. The SR flip-flop 22 produces the equalizing pulse period detection signal Ds (FIG. 4), which is supplied via an output terminal 23 to the system controller 9 of FIG. 2.

This embodiment is arranged to form the equalizing pulse period detection signal Ds on the basis of the composite sync signal Csync, the signal A which is a ½ H killer signal and the signal B which is an edge detection signal for the edge of the horizontal sync signal. These signals Csync, A and B are indispensable for a digital signal processing circuit. Further, since the arrangement shown in FIG. 3 is used also for a skew compensating process, a virtual increase in the scale of the circuit can be minimized.

The composite sync signal is correctly separated by the sync signal separation circuit 5 with the clamping action correctly performed by the clamping circuit 2 of FIG. 2. Then, the equalizing pulse period detection signal Ds generated by the equalizing pulse period detection signal generating circuit of FIG. 3 has a waveform which is as indicated by a symbol Ds in FIG. 4. The fall edge of the vertical sync signal is within a period of 7 H±3 H after the PG pulse as mentioned in the foregoing. Therefore, the rise edge of the equalizing pulse period detection signal Ds as indicated by "X" in FIG. 4 appears within a period of 5 H±3 H after the PG pulse, and the fall edge thereof appears within a period of 14 H±3 H after the PG pulse as indicated by "Y" in FIG. 4. Therefore, the level of the equalizing pulse period detection signal Ds is low at a point of time 1 H after the PG pulse; high at a point of time 9 H after the PG pulse; and low at a point of time 18 H after the PG pulse.

The system controller 9 of FIG. 2 makes a check to find if the equalizing pulse period detection signal Ds which is supplied from the sync signal generator 6 satisfies the condition that the level of it is low at a point of time 1 H after the PG pulse, high at a point of time 9 H after the PG pulse and low at a point of time 18 H after the PG pulse. The system controller 9 causes the connecting position of the change-over switch 8 to be on its one side "a" if the equalizing pulse period detection signal meets the condition and to be on the other side "b" if the equalizing pulse period detection signal fails to meet the condition.

When the connecting position of the change-over switch 8 is set on the side "a" in accordance with the instruction of the system controller 9, the clamping circuit 2 clamps the reproduced analog image signal at a given clamp level according to the clamp pulse signal Cp which is formed by the sync signal generator 6. The clamping action continues for a high-level period of the clamp pulse signal Cp. If the connecting position of the change-over switch 8 is set on the other side "b" in accordance with the instruction of the system controller 9, this fact means that the clamping circuit 2 is not correctly performing its clamping action and the composite sync signal is not being correctly separated by the sync signal separation circuit 5. In this case, therefore, the clamp circuit 2 is caused to always clamp the reproduced analog image signal at a given level in accordance with the given voltage signal Vcc which is supplied via the input terminal 10 always at a high level. This arrangement enables the clamping circuit 2 to clamp the image signal at such a clamp level that the analog-to-digital converting action is accurately performed by the A/D converter 3 and the composite sync signal is accurately separated by the sync signal separation circuit 5.

The arrangement described above with reference to FIGS. 2, 3 and 4 enables the embodiment to accurately and stably perform the clamping process.

In the case of this embodiment, as shown in the timing chart of FIG. 4, there is a part where the period of the composite sync signal changes from an even-number field period to an odd-number field period. In the case of a part where the period of the composite sync signal changes from an odd-number field period to an even-number field period, the rise and the fall of the equalizing pulse period detection signal Ds take place earlier by ½ H period. However, the above-stated condition to be determined at the system controller 9 remains unchanged even in that case.

In the case of the circuit arrangement of this embodiment, the sync signal separating process, etc., are arranged to be performed in a digital manner. However, the invention is also applicable to a circuit arranged to operate in an analog manner instead of the digital manner.

Next, in a case where skew compensation is to be made by using the equalizing pulse period detection signal Ds output from the sync signal generator 6, the embodiment operates as described below with reference to FIG. 6:

As is well known, a still video system is sometimes operated to repeatedly reproduce one field amount of an image signal recorded on a magnetic disc. This reproducing operation is called field reproduction. In the case of the field reproduction, the image signal must be skew-compensated for every one-field period as the reproduced image signal is interlaced in that instance.

The skew compensation is made as follows: in order that the image signal of an even-number field is formed from the image signal of an odd-number field and vice versa, a part of the image signal excluding the vertical sync signal Vsync is delayed ½ H period relative to the vertical sync signal Vsync for every other field period.

Figure 5:
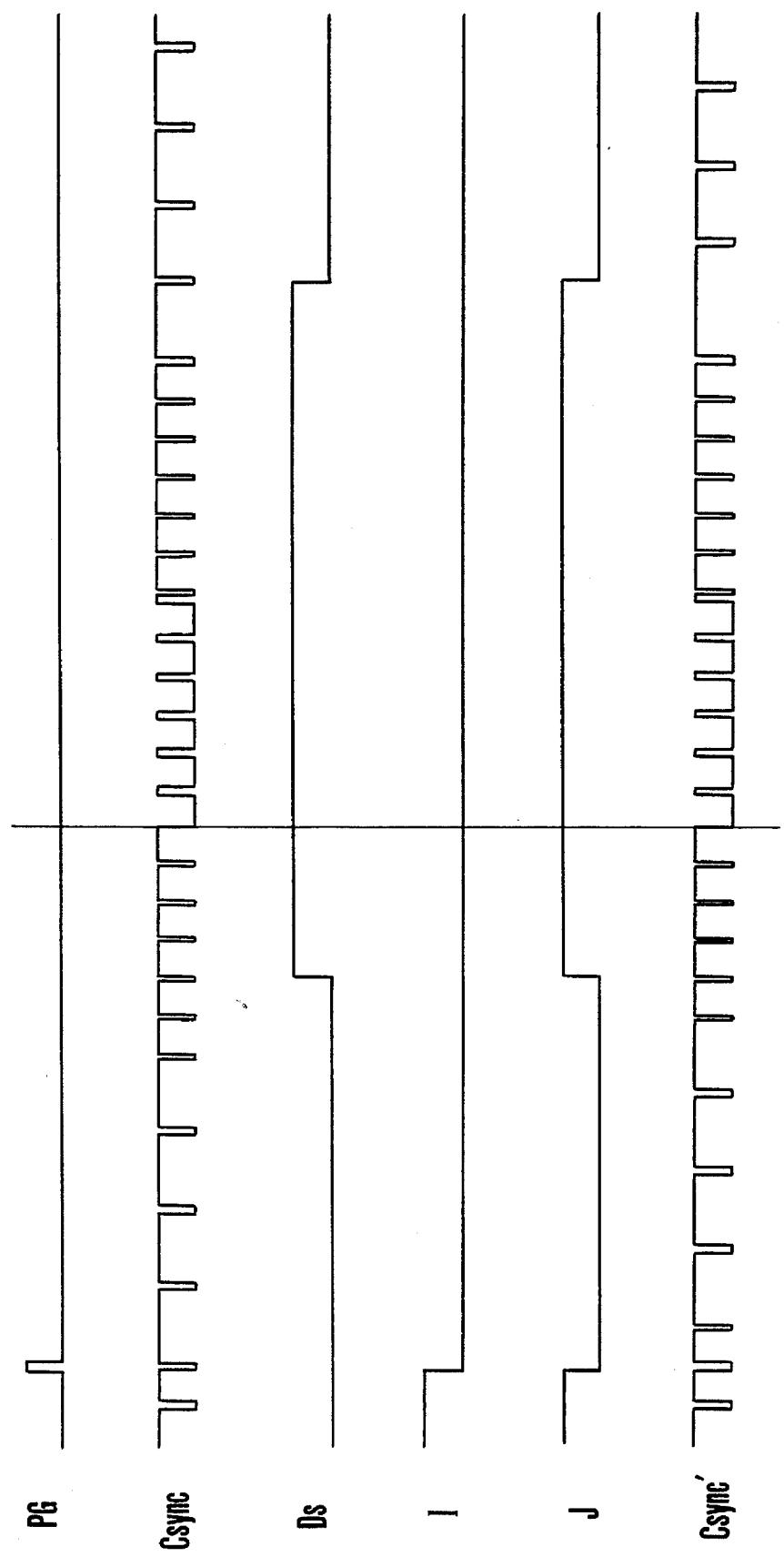
FIG. 5 is a timing chart showing the action of the first embodiment performed for skew compensation.

The skew compensation can be made by using the equalizing pulse period detection signal Ds, because the vertical sync signal is included in an equalizing pulse period designated by the equalizing pulse period detection signal Ds. In other words, a signal I the phase of which is inverted at every edge of the PG pulse (PG) as shown in FIG. 5 is formed through a flip-flop, etc., by using the PG pulse. A signal J as shown in FIG. 5 is formed by obtaining the logical sum of the equalizing pulse period detection signal Ds and the signal I by means of an OR gate, etc. Then, the process of skew compensation can be accomplished by delaying the image signal ½ H period during a low-level period of the signal J and by allowing the image signal to be output as it is without delaying it ½ H period during a high-level period of the signal J. The composite sync signal is obtained after the skew compensation process in a state as indicated by a reference symbol Csync' in FIG. 5.

Further, since the equalizing pulse period detection signal is a signal which is necessary also for the skew compensation, the above-stated arrangement to make the clamp pulse change-over by means of this equalizing pulse period detection signal for an accurate and stable clamping action can be put into practice without causing any substantial increase in the scale of the circuit.

Figure 6:
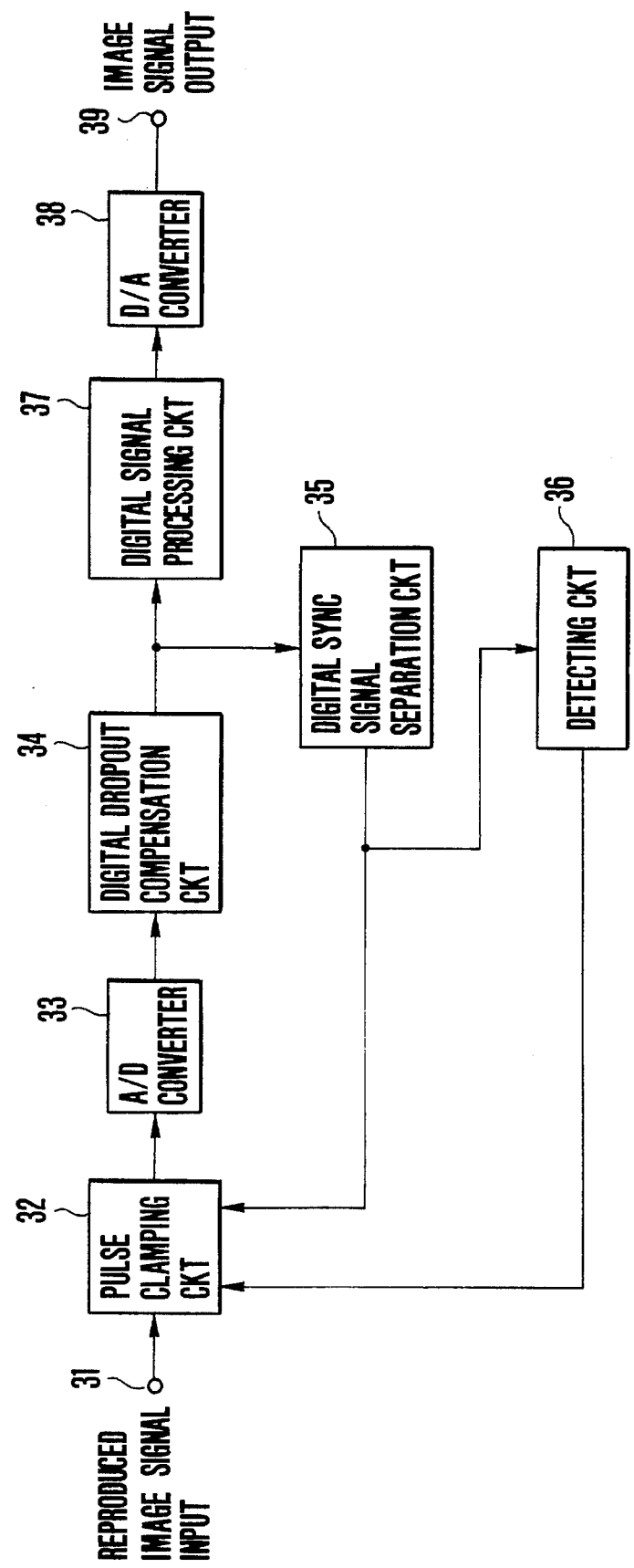
FIG. 6 is a block diagram showing in outline the arrangement of an image signal processing device which is arranged according to this invention as a second embodiment thereof.

FIG. 6 shows in outline the arrangement of an image signal processing device which is arranged as a second embodiment of this invention. The illustration includes an input terminal 31 for receiving a reproduced image signal; a pulse clamping circuit 32; an A/D converter 33; a digital dropout compensation circuit 34; a digital sync signal separation circuit 35; a detecting circuit 36 which is arranged to find if any abnormality is occurring in a composite sync signal separated by the above-stated digital sync signal separation circuit 35; a digital signal processing circuit 37;

a D/A converter 38; and an output terminal 39 for outputting the image signal.

Referring to FIG. 6, a reproduced image signal obtained from a recording medium which is not shown is supplied via the input terminal 31 to the pulse clamping circuit 32. The pulse clamping circuit 32 then performs a clamping process on the reproduced image signal input in such a way as to bring the image signal into a level range which ensures the correctness of A/D conversion to be performed by the A/D converter 33. The image signal thus processed is supplied to the A/D converter 33.

The A/D converter 33 then digitizes the image signal clamp-processed by the pulse clamping circuit 32. The digitized image signal is supplied to the digital dropout compensation circuit 34 to be compensated for any dropout. After the dropout compensation, the digital image signal is supplied to the digital signal processing circuit 37 to be subjected to various digital signal processing actions such as a noise reduction process, etc. After the digital processing circuit 37, the digital image signal is restored into the form of an analog signal by the D/A converter 38 and is output from the output terminal 39.

The clamping action of the pulse clamping circuit 32 of FIG. 6 is arranged to be performed under the control of a composite sync signal which is separated by the digital sync signal separation circuit 35 from the digital image signal after the dropout compensation by the digital dropout compensation circuit 34 and a detection signal which is output from the detecting circuit 36.

The operation of the pulse clamping circuit 32 is described as follows: FIGS. 7(a) and 7(b) show in a timing chart the normally operating state of the pulse clamping circuit 32. The clamp pulses are arranged to be produced by the digital sync signal separation circuit 35 in a manner as shown in FIG. 7(b) when the fall level of a composite sync signal part of the digital image signal output from the digital dropout compensation circuit 34 reaches a reference level which is indicated by a broken line in FIG. 7(a). In synchronism with the clamp pulses, the pulse clamping circuit 32 clamps the reproduced image signal at a clamp level which is as shown in FIG. 7(a). Therefore, in the reproduced image signal output from the pulse clamping circuit 32, the tip level of the composite sync signal is in a state of being clamped at a minimum level within the conversion level range A of the A/D converter 33 which is as shown in FIG. 7(a). After the pulse clamping circuit 32, therefore, the composite sync signal is accurately and stably separated by the digital sync signal separation circuit 35. The pulse clamping action is thus stably carried out by the pulse clamping circuit 32.

However, the reproduced image signal still remains in an unstable state at the time of the start of the device. In the initial stage, therefore, the digital image signal output from the digital dropout compensation circuit 34 might have the tip of the composite sync signal at a level which is higher than the reference level as shown in FIG. 8(a) or much lower than the reference level as shown in FIG. 8(b). Under such a condition, the clamp pulses cannot be generated as the composite sync signal and cannot be separated by the digital sync signal separation circuit 35.

In a case where the reproduced image signal has a special signal waveform and, in addition to that, the tip level of the composite sync signal included therein is extremely lower than the reference level, as shown in FIG. 8(c), the digital sync signal separation circuit 35 generates the clamp pulses at a timing point B as shown in FIG. 8(c) when the fall level of the image signal reaches the reference level. In that instance, therefore, the clamping process of the pulse clamping circuit 32 might be performed at an erroneous timing point.

To solve this problem, the second embodiment is arranged to detect the above-stated abnormality of the composite sync signal by means of the detecting circuit 36 and to control the clamping action of the pulse clamping circuit 32 according to the result of the detection.

The clamp pulses generated by the digital sync signal separation circuit 35 are supplied to the detecting circuit 36. The detecting circuit 36 is arranged to produce a detection signal and supply it to the pulse clamping circuit 32 when no clamp pulse is supplied from the digital sync signal separation circuit 35 during more than a given period of time.

FIG. 9(a) shows by way of example the arrangement of the above-stated detecting circuit 36. As shown in FIG. 9(a), the clamp pulses (see FIG. 9(b)) which are generated by the digital sync signal separation circuit 35 are supplied via an input terminal 36a to a counter 36b. The counter 36b counts the number of clock pulses which are supplied from a clock pulse generator 36c. The counter 36b is arranged to supply a detection signal generator 36d with data relative to a counted value thus obtained as shown in FIG. 9(c) and to be reset by the clamp pulses.

When the counted value data supplied from the counter 36b comes to exceed a given threshold value N which is as shown in FIG. 9(c), the detection signal generator 36d generates a detection signal which is as shown in FIG. 9(d). The detection signal thus generated is supplied via an output terminal 36e to the pulse clamping circuit 32 which is shown in FIG. 6.

Since the counter 36b is arranged to be reset by the clamp pulse while the pulse clamping circuit 32 is performing the clamping action in a normal manner, the threshold value N set by the detection signal generator 36d is arranged to exceed a counted value obtained during one horizontal sync period by the counter 36b. Therefore, no detection signal is output from the detection signal generator 36d as long as the pulse clamping circuit 32 is operating in a normal manner.

As mentioned above, the clamp pulses are not output from the digital sync signal separation circuit 35 when the composite sync signal is in an abnormal state as shown in FIG. 8 (a) or 8 (b). In this instance, therefore, with the threshold value N set as shown in FIG. 9(c), the detecting circuit 36 produces the detection signal after the lapse of three horizontal sync periods. Further, in the event of the abnormality of the composite sync signal as shown in FIG. 8(c), there exists only the composite sync signal during the vertical blanking period of the image signal. Besides, the level of the composite sync signal becomes extremely lower than the reference level shown in FIG. 8(c). Therefore, no clamp pulse is output from the digital sync signal separation circuit 35. Then, the threshold value N which is set as shown in FIG. 9(c) enables the detection signal to be output after the lapse of three horizontal sync periods from the commencement of the vertical blanking period.

FIG. 10(a) shows another example of an arrangement of the detecting circuit 36. Only a part of the arrangement of the detecting circuit 36 is shown in FIG. 10(a).

Referring to FIG. 10(a), the detecting circuit 36 includes resistors R1, R2 and R3, a transistor TR1, and a capacitor C. The clamp pulses which are generated by the digital sync signal separation circuit 35 as shown in FIG. 10(b) are supplied to an input terminal 36f of the detecting circuit 36. As a result, the collector potential of the transistor TR1 gives a voltage signal in conjunction with the resistor R3 and the time constant of the capacitor C as shown in FIG. 10(c). This voltage signal is output from an output terminal 36g.

The detecting circuit 36 is thus arranged to generate a detection signal which is as shown in FIG. 10(d) by means of the detection signal generator 36d which is shown in FIG. 9(a) or the like when the voltage signal which is output from the above-stated output terminal 36g exceeds the threshold voltage Ds. This arrangement enables the detecting circuit arrangement of FIG. 10(a) to detect an abnormality of the composite sync signal and to generate the detection signal in the same manner as the arrangement shown in FIG. 9(a).

Figure 11:
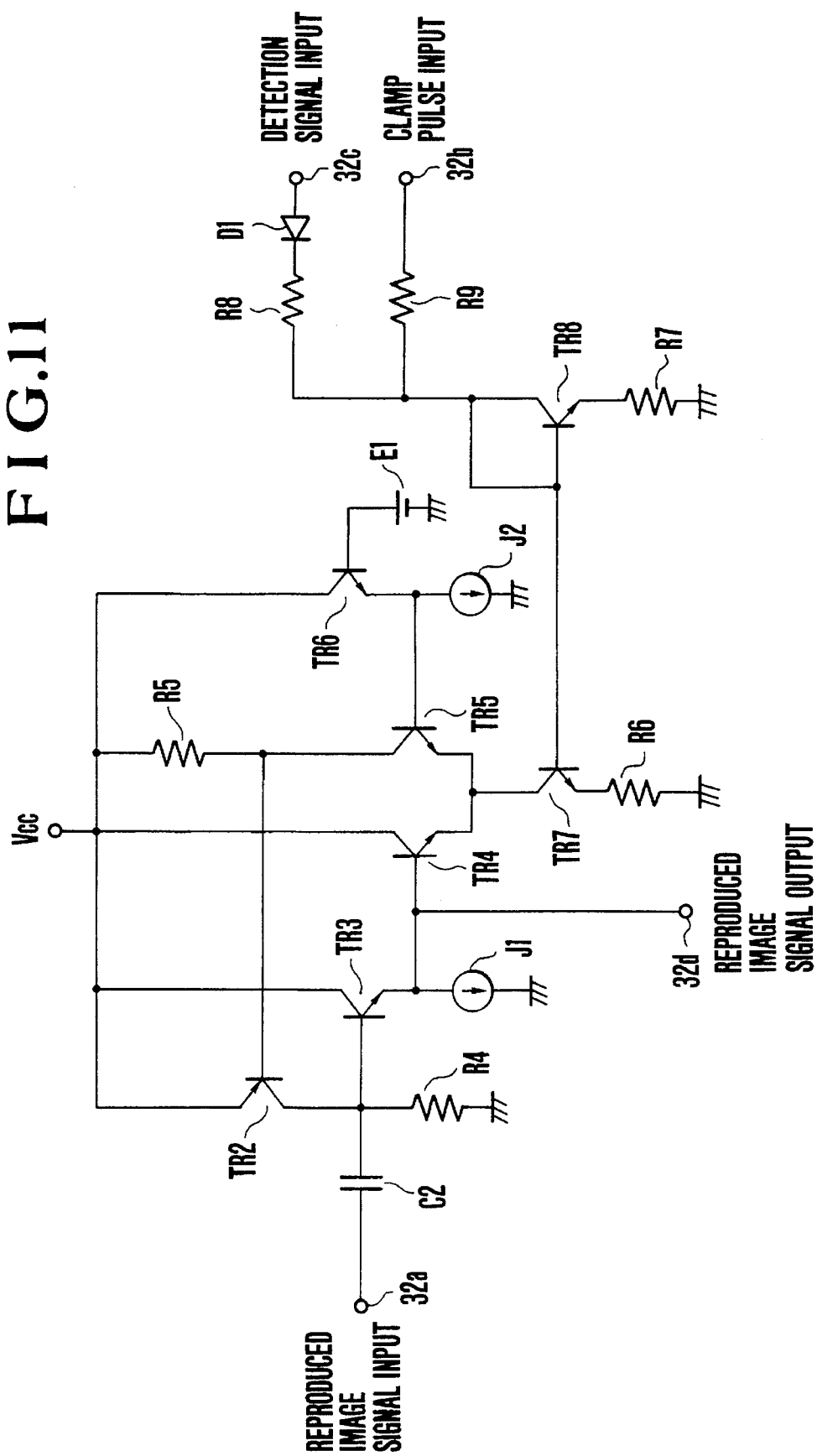
FIG. 11 is a circuit diagram showing by way of example the arrangement of the pulse clamping circuit 32 shown in FIG. 6.

FIG. 11 shows by way of example the details of a practicable arrangement of the pulse clamping circuit 32 of FIG. 6. As shown in FIG. 11, the pulse clamping circuit 32 includes resistors R4 to R9, transistors TR2 to TR8, current sources J1 and J2, a voltage source E1 and a diode D1. These elements jointly form a clamping circuit of a feedback type.

Referring to FIG. 11, a reproduced image signal obtained from a recording medium which is not shown is supplied to an input terminal 32a. An input terminal 32b is arranged to receive the clamp pulses which are output from the digital sync signal separation circuit 35. An input terminal 32c is arranged to receive the detection signal which is output from the detecting circuit 36.

A current mirror circuit which is formed by the transistors TR7 and TR8 is arranged to operate according to the clamp pulses supplied via the input terminal 32b. In other words, both the transistors TR7 and TR8 are arranged to be turned on by the clamp pulses. As a result, from an output terminal 32d is output the reproduced image signal in which the tip level of the composite sync signal is clamped at a voltage level E1-VBE, wherein VBE represents a voltage between the base and the emitter of the transistor TR6. Further, the voltage level E1-VBE is set at the clamp level which is as shown in FIG. 7(a).

Further, in a case where some abnormality is occurring in the composite sync signal, the detection signal is supplied from the above-stated detecting circuit 36 via the input terminal 32c. In this case, the transistors TR7 and TR8 which form the current mirror circuit are continuously in their on-states for a period during which the detection signal is at a high level. The current mirror circuit thus causes the tip level of the composite sync signal to be continuously clamped at the voltage level E1-VBE.

When the composite sync signal is in a state as shown in FIG. 8(a), the transistor TR2 is turned off to lower the base potential of the transistor TR3 due to the discharge of the resistor R4. In the case of FIG. 8(b) or FIG. 8(c), the transistor TR2 is turned on for charging. The base potential of the transistor TR3 then rises to bring about a condition under which the pulse clamping action can be performed in a normal manner without fail at least during the vertical blanking period.

As described in the foregoing, the pulse clamping process can be stably accomplished on the reproduced image signal before digital conversion by using the composite sync signal separated from the digital image signal which is obtained through the A/D converter. A dropout compensating process and a composite sync signal separating process thus can be accomplished in a digital manner.

FIG. 12 shows in outline the arrangement of an image signal processing device which is arranged as a third embodiment of this invention. In FIG. 12, all component parts that are arranged in the same manner as those of FIG. 6 are indicated by the same reference numerals and details of them are omitted from description.

In FIG. 12, a reference numeral 32' denotes a pulse clamping circuit. A numeral 40 denotes a subtracter. A numeral 41 denotes a reference signal generator. A numeral 42 denotes a D/A converter.

A difference of the third embodiment from the second embodiment shown in FIG. 6 lies in that the third embodiment is arranged to perform a digital feedback clamping action with the above-stated component parts.

In the third embodiment shown in FIG. 12, the subtracter 40 is arranged to subtract a reference signal which is generated by the reference signal generator 41 from a digital image signal which is output from an A/D converter 33. The D/A converter 42 then converts the output of the subtracter 40 into an analog signal. After that, a DC feedback process is performed by supplying the analog signal back to a pulse clamping circuit 32'.

More specifically, the pulse clamping circuit 32' is arranged to perform a pulse clamping action according to the clamp pulses. Then, a negative feedback is applied to the pulse clamping circuit 32' in such a manner that the level of the tip part of a composite sync signal included in the digital image signal becomes equal to the level of the reference signal generated by the reference signal generator 41 during the period of the pulse clamping process.

In a case where the level of the composite sync signal is unstable at the start of the device or the like, the pulse clamping circuit 32' is controlled in accordance with a detection signal which is output from a detecting circuit 36 in the same manner as in the case of the second embodiment, so that the pulse clamping circuit 32' can be brought into a state of normally performing the pulse clamping action.

As described in the foregoing, a digital feedback clamping circuit is also usable for the pulse clamping process of the embodiment. Therefore, any desired pulse clamping circuit is usable in accordance with this invention.

The embodiment described is arranged to be suitable to digital signal processing with an analog signal processing circuit portion reduced. Therefore, this arrangement facilitates the use of an IC, enhances the stability of the device relative to temperature variations, and also facilitates adjustment work.

The arrangement of the embodiment described thus gives an image signal processing device which facilitates the use of an IC, excels in operating stability relative to temperature variations, and facilitates adjustment work, etc.

What is claimed is:

1. An image signal processing device for processing image signals, comprising:

a) clamping means arranged to receive an analog image signal, to clamp the received analog image signal and to output a clamped analog image signal;

b) analog-to-digital converting means for converting the analog image signal clamped by said clamping means into a digital image signal;

c) digital image signal processing means arranged to subject the digital image signal output from said analog-to-digital converting means to digital signal processing action and to output the processed digital image signal; and d) control means for controlling a clamping action of said clamping means in such a manner that said clamping action is performed in a continuous manner until the operation of the device rises to a predetermined status, and thereafter said clamping action is performed in an intermittent manner.

2. A device according to claim 1, wherein said clamping means includes a pulse clamping circuit arranged to receive an analog image signal, to pulse-clamp the received analog image signal and to output a clamped analog image signal.

3. A device according to claim 1, wherein said clamping means includes a feedback clamping circuit arranged to receive an analog image signal, to feedback-clamp the received analog image signal and to output a clamped analog image signal.

4. A device according to claim 1, wherein said control means is arranged to cause said clamping means to intermittently perform a clamping action on the received image signal, if the synchronizing signal included in the digital image signal output from said digital image signal processing means is in a predetermined state, and to continuously perform the clamping action, if the synchronizing signal is not in the predetermined state.

5. A device according to claim 1, wherein said digital image signal processing means includes a digital dropout compensation circuit arranged to compensate a dropout occurring in the digital image signal.

6. A device according to claim 1, further comprising digital-to-analog converting means arranged to convert into an analog image signal the processed digital image signal output by said digital image signal processing means.

* * * * *

UNITED STATES PATENT AND TRADEMARK OFFICE
CERTIFICATE OF CORRECTION

PATENT NO. : 5,461,489
DATED : October 24, 1995
INVENTOR(S) : Eiji Ohara, et al.

It is certified that error appears in the above-indentified patent and that said Letters Patent is hereby corrected as shown below:

Col.3, line 51, change ("PG" coil) to -- ("PG coil") --.

Col.6, line 19, change "FIG 6" to -- FIG. 5 --.

Signed and Sealed this

Fourteenth Day of May, 1996

Attest:

BRUCE LEHMAN

Attesting Officer     Commissioner of Patents and Trademarks